United States Patent
Sonar et al.

(10) Patent No.: US 12,307,279 B2
(45) Date of Patent: May 20, 2025

(54) SYSTEM AND METHOD OF VM RECOVERY ON S3 COMPATIBLE OBJECT STORAGE

(71) Applicant: Nutanix, Inc., San Jose, CA (US)

(72) Inventors: Anirudha Narsinha Sonar, San Jose, CA (US); Sreejith Mohanan, San Jose, CA (US); Xingchi Jin, Union City, CA (US); Xuerong Hu, Union City, CA (US)

(73) Assignee: Nutanix, Inc., San Jose, CA (US)

( * ) Notice: Subject to any disclaimer, the term of this patent is extended or adjusted under 35 U.S.C. 154(b) by 600 days.

(21) Appl. No.: 17/589,686

(22) Filed: Jan. 31, 2022

(65) Prior Publication Data
US 2022/0244979 A1 Aug. 4, 2022

Related U.S. Application Data

(60) Provisional application No. 63/144,238, filed on Feb. 1, 2021.

(51) Int. Cl.
*G06F 9/455* (2018.01)
(52) U.S. Cl.
CPC .. *G06F 9/45558* (2013.01); *G06F 2009/4557* (2013.01); *G06F 2009/45583* (2013.01); *G06F 2009/45595* (2013.01)
(58) Field of Classification Search
CPC ......... G06F 9/45558; G06F 2009/4557; G06F 2009/45583; G06F 2009/45595; G06F 11/1446; G06F 2009/45575; G06F 2009/45579; G06F 2201/815; G06F 2201/84
See application file for complete search history.

(56) References Cited

U.S. PATENT DOCUMENTS 5,802,309 A 9/1998 Cook et al.
5,960,194 A 9/1999 Choy et al.
(Continued)

FOREIGN PATENT DOCUMENTS

CN 113406169 A 9/2021
EP 4 006 737 A1 6/2022
(Continued)

OTHER PUBLICATIONS

Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.
(Continued)

*Primary Examiner* — Kenneth Tang
(74) *Attorney, Agent, or Firm* — Foley & Lardner LLP

(57) ABSTRACT

In accordance with some aspects of the present disclosure, a non-transitory computer readable medium is disclosed. In some embodiments, the non-transitory computer readable medium includes instructions when executed by a processor cause the processor to expose, to a client, an immutable object as a volume. In some embodiments, the non-transitory computer readable medium includes instructions when executed by a processor cause the processor to manage local access to a portion of the immutable object. In some embodiments, the client locally accesses the portion of the immutable object as a block of the volume.

9 Claims, 11 Drawing Sheets

(56) References Cited

U.S. PATENT DOCUMENTS

| | | |
|---|---|---|
| 6,209,128 B1 | 3/2001 | Gerard et al. |
| 6,775,673 B2 | 8/2004 | Mahalingam et al. |
| 7,260,563 B1 | 8/2007 | Priyadarshi et al. |
| 7,395,279 B2 | 7/2008 | Iyengar et al. |
| 7,461,912 B2 | 12/2008 | Kamiyama et al. |
| 7,653,668 B1 | 1/2010 | Shelat et al. |
| 7,685,109 B1 | 3/2010 | Ransil et al. |
| 7,721,044 B1 | 5/2010 | Chatterjee et al. |
| 7,774,329 B1 | 8/2010 | Peddy et al. |
| 8,019,732 B2 | 9/2011 | Paterson-Jones et al. |
| 8,166,128 B1 | 4/2012 | Faulkner et al. |
| 8,250,033 B1 | 8/2012 | De Souter et al. |
| 8,311,859 B2 | 11/2012 | Patoureaux et al. |
| 8,312,027 B2 | 11/2012 | Lamb et al. |
| 8,352,424 B2 | 1/2013 | Zunger et al. |
| 8,429,242 B1 | 4/2013 | Todd |
| 8,533,181 B2 | 9/2013 | Hu et al. |
| 8,538,919 B1 * | 9/2013 | Nielsen ............... H04L 63/0272 718/1 |
| 8,549,518 B1 | 10/2013 | Aron et al. |
| 8,554,724 B2 | 10/2013 | Zunger |
| 8,601,473 B1 | 12/2013 | Aron et al. |
| 8,683,112 B2 | 3/2014 | Drobychev et al. |
| 8,799,222 B2 | 8/2014 | Marathe et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1 | 6/2015 | Barber et al. |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 | 2/2016 | Leibowitz et al. |
| 9,336,132 B1 | 5/2016 | Aron et al. |
| 9,342,253 B1 | 5/2016 | Muthukkaruppan et al. |
| 9,350,623 B1 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,733,966 B1 * | 8/2017 | Stevens ................. G06F 16/148 |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,095,549 B1 | 10/2018 | Needham et al. |
| 10,120,902 B2 | 11/2018 | Erdogan et al. |
| 10,152,428 B1 | 12/2018 | Alshawabkeh et al. |
| 10,176,225 B2 | 1/2019 | Naidu et al. |
| 10,296,255 B1 | 5/2019 | Tummala |
| 10,380,078 B1 | 8/2019 | Kumar et al. |
| 10,409,837 B1 | 9/2019 | Schmidt et al. |
| 10,430,084 B2 | 10/2019 | Goss et al. |
| 10,430,441 B1 | 10/2019 | Canton |
| 10,528,262 B1 | 1/2020 | Shmuylovich et al. |
| 10,565,230 B2 | 2/2020 | Zheng et al. |
| 10,592,495 B1 | 3/2020 | Shami et al. |
| 10,659,520 B1 | 5/2020 | Sethuramalingam et al. |
| 10,691,464 B1 | 6/2020 | Drego et al. |
| 10,721,141 B1 | 7/2020 | Verma et al. |
| 10,725,826 B1 | 7/2020 | Sagar et al. |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 10,915,497 B1 | 2/2021 | Bono et al. |
| 11,048,545 B2 | 6/2021 | Kedem |
| 11,086,545 B1 | 8/2021 | Dayal et al. |
| 11,099,938 B2 | 8/2021 | Desai et al. |
| 11,341,099 B1 * | 5/2022 | Wolfson ............... G06F 9/45558 |
| 2001/0034733 A1 | 10/2001 | Prompt et al. |
| 2002/0065776 A1 | 5/2002 | Calder et al. |
| 2002/0078065 A1 | 6/2002 | Agulhon |
| 2003/0023587 A1 | 1/2003 | Dennis et al. |
| 2003/0145310 A1 | 7/2003 | Thames et al. |
| 2003/0172094 A1 | 9/2003 | Lauria et al. |
| 2003/0191745 A1 | 10/2003 | Jiang et al. |
| 2004/0186826 A1 | 9/2004 | Choi et al. |
| 2005/0127171 A1 | 6/2005 | Ahuja et al. |
| 2005/0273571 A1 | 12/2005 | Lyon et al. |
| 2006/0041661 A1 | 2/2006 | Erickson et al. |
| 2006/0047636 A1 | 3/2006 | Mohania et al. |
| 2006/0080443 A1 | 4/2006 | Kruglick et al. |
| 2006/0080646 A1 | 4/2006 | Aman |
| 2006/0161704 A1 | 7/2006 | Nystad et al. |
| 2006/0198322 A1 | 9/2006 | Hares |
| 2007/0088744 A1 | 4/2007 | Webber et al. |
| 2008/0034307 A1 | 2/2008 | Cisler et al. |
| 2008/0263222 A1 | 10/2008 | Matsuzawa et al. |
| 2009/0171697 A1 | 7/2009 | Glauser et al. |
| 2009/0327621 A1 | 12/2009 | Kliot et al. |
| 2010/0042673 A1 | 2/2010 | Dayley |
| 2010/0050173 A1 | 2/2010 | Hensbergen |
| 2010/0293174 A1 | 11/2010 | Bennett et al. |
| 2011/0082962 A1 | 4/2011 | Horovitz et al. |
| 2011/0137966 A1 | 6/2011 | Srinivasan et al. |
| 2011/0185355 A1 | 7/2011 | Chawla et al. |
| 2011/0213884 A1 | 9/2011 | Ferris et al. |
| 2011/0258297 A1 | 10/2011 | Nightingale et al. |
| 2012/0096052 A1 | 4/2012 | Tolia et al. |
| 2012/0096205 A1 | 4/2012 | Velayudhan et al. |
| 2012/0210095 A1 | 8/2012 | Nellans et al. |
| 2012/0293886 A1 | 11/2012 | Abe et al. |
| 2012/0331065 A1 | 12/2012 | Aho et al. |
| 2012/0331243 A1 | 12/2012 | Aho et al. |
| 2013/0054523 A1 | 2/2013 | Anglin et al. |
| 2013/0103884 A1 | 4/2013 | Cho |
| 2013/0198472 A1 | 8/2013 | Fang et al. |
| 2013/0246431 A1 | 9/2013 | Ahuja et al. |
| 2013/0332608 A1 | 12/2013 | Shiga et al. |
| 2014/0095459 A1 | 4/2014 | Eshel et al. |
| 2014/0115154 A1 | 4/2014 | Mack-Crane et al. |
| 2014/0173227 A1 | 6/2014 | Min et al. |
| 2014/0279838 A1 | 9/2014 | Tsirogiannis et al. |
| 2014/0282626 A1 | 9/2014 | Muguda |
| 2014/0339117 A1 | 11/2014 | Quan et al. |
| 2014/0379840 A1 | 12/2014 | Dao |
| 2015/0012571 A1 | 1/2015 | Powell et al. |
| 2015/0046586 A1 | 2/2015 | Zhang et al. |
| 2015/0046600 A1 | 2/2015 | Kim |
| 2015/0079966 A1 | 3/2015 | Govindarajeswaran et al. |
| 2015/0208985 A1 | 7/2015 | Huang |
| 2015/0254325 A1 | 9/2015 | Stringham |
| 2015/0286413 A1 | 10/2015 | Olson et al. |
| 2015/0378767 A1 | 12/2015 | Tarasuk-Levin et al. |
| 2016/0011805 A1 | 1/2016 | Nakagawa et al. |
| 2016/0048408 A1 * | 2/2016 | Madhu ................. H04L 47/783 718/1 |
| 2016/0092326 A1 | 3/2016 | Wu et al. |
| 2016/0117226 A1 | 4/2016 | Hetrick et al. |
| 2016/0162547 A1 | 6/2016 | Morris |
| 2016/0179839 A1 * | 6/2016 | Sundaram ............... G06F 21/78 707/639 |
| 2016/0188407 A1 | 6/2016 | Bronnikov et al. |
| 2016/0207673 A1 | 7/2016 | Shlonsky et al. |
| 2016/0275125 A1 | 9/2016 | Drobychev et al. |
| 2016/0306643 A1 | 10/2016 | Klee et al. |
| 2017/0075909 A1 | 3/2017 | Goodson et al. |
| 2017/0091235 A1 | 3/2017 | Yammine et al. |
| 2017/0109348 A1 | 4/2017 | Nagaraj et al. |
| 2017/0109421 A1 | 4/2017 | Stearn et al. |
| 2017/0235764 A1 | 8/2017 | Sharpe et al. |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0287996 A1 | 10/2018 | Tripathy et al. |
| 2018/0292999 A1 | 10/2018 | Nadkarni |
| 2018/0349463 A1 | 12/2018 | Bernhardy et al. |

(56) References Cited

U.S. PATENT DOCUMENTS

| | | |
|---|---|---|
| 2019/0004863 A1 | 1/2019 | Mainali et al. |
| 2019/0050296 A1 | 2/2019 | Luo et al. |
| 2019/0102256 A1 | 4/2019 | Murphy |
| 2019/0196885 A1 | 6/2019 | Song et al. |
| 2019/0207929 A1 | 7/2019 | Koorapati et al. |
| 2019/0213175 A1 | 7/2019 | Kong et al. |
| 2019/0213179 A1 | 7/2019 | McHugh et al. |
| 2019/0227713 A1 | 7/2019 | Parthasarathy |
| 2019/0243547 A1 | 8/2019 | Duggal et al. |
| 2019/0286465 A1 | 9/2019 | Cui et al. |
| 2019/0324874 A1 | 10/2019 | Gill et al. |
| 2019/0354544 A1 | 11/2019 | Hertz et al. |
| 2019/0370043 A1 | 12/2019 | Olderdissen |
| 2019/0370362 A1 | 12/2019 | Mainali et al. |
| 2019/0384678 A1 | 12/2019 | Samprathi et al. |
| 2019/0391843 A1 | 12/2019 | Franciosi et al. |
| 2019/0394162 A1 | 12/2019 | Chalakov et al. |
| 2020/0004570 A1 | 1/2020 | Glade et al. |
| 2020/0036787 A1 | 1/2020 | Gupta et al. |
| 2020/0042364 A1 | 2/2020 | Kumar Shimoga Manjunatha et al. |
| 2020/0104222 A1 | 4/2020 | Ramamoorthi et al. |
| 2020/0117637 A1 | 4/2020 | Roy et al. |
| 2020/0183886 A1* | 6/2020 | Wang ............... G06F 16/1744 |
| 2020/0195743 A1 | 6/2020 | Jiang et al. |
| 2020/0201724 A1 | 6/2020 | Saito et al. |
| 2020/0250044 A1 | 8/2020 | Sharma et al. |
| 2020/0310859 A1 | 10/2020 | Gupta et al. |
| 2020/0310915 A1 | 10/2020 | Alluboyina et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1 | 10/2020 | Jawahar et al. |
| 2020/0326876 A1 | 10/2020 | Tian et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |
| 2021/0064585 A1 | 3/2021 | Chen |
| 2021/0072917 A1 | 3/2021 | Surla et al. |
| 2021/0124651 A1 | 4/2021 | Srinivasan et al. |
| 2021/0181962 A1 | 6/2021 | Dai et al. |
| 2021/0294499 A1 | 9/2021 | Wang et al. |
| 2021/0357294 A1* | 11/2021 | Balcha ............... G06F 11/1458 |
| 2021/0365330 A1* | 11/2021 | Kushnir ............. G06F 11/1469 |
| 2021/0406224 A1 | 12/2021 | Neufeld et al. |
| 2022/0035537 A1* | 2/2022 | Dillaman ............ G06F 3/0604 |
| 2022/0035714 A1* | 2/2022 | Schultz .............. G06F 11/3409 |
| 2022/0050858 A1* | 2/2022 | Karr .................. G06F 11/3466 |
| 2022/0067011 A1 | 3/2022 | Yue et al. |
| 2022/0129183 A1 | 4/2022 | Chitloor et al. |
| 2022/0229604 A1* | 7/2022 | Black ................. G06F 3/0665 |
| 2023/0108127 A1* | 4/2023 | Shemer ............... G06F 11/1484 714/19 |

FOREIGN PATENT DOCUMENTS

| | | |
|---|---|---|
| WO | WO-2020/146043 A1 | 7/2020 |
| WO | WO-2021/119546 A1 | 6/2021 |
| WO | WO-2021/232109 A1 | 11/2021 |

OTHER PUBLICATIONS

Foreign Search Report on EP dated Feb. 14, 2024.
Sonobuoy Overview, https://sonobuoy.io/docs/v0.56.10/.
Final Office Action on U.S. Appl. No. 17/358,967 DTD Feb. 22, 2023.
"Choosing a load balancer for your object storage environment", NetApp 2020.
"NetApp StorageGRID", NetApp 2022.
"Tutorial: Transferring data from on-premises storage to Amazon S3 in a different AWS account", https://docs.aws.amazon.com/datasync/latest/userguide/s3-cross-account-transfer.html, accessed Dec. 12, 2022.
"What is AWS Data Sync?", https://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.
Cloudian, "Simple, Secure, Scalable. S3-Compatible, Cloud Native Data Management", https://cloudian.com/products/hyperstore/, accessed Dec. 12, 2022.
NetApp, "StorageGRID: Smart, fast, future-proof object storage", https://www.netapp.com/data-storage/storagegrid/, accessed Dec. 12, 2022.
OpenStack. Openstack Object Storage API V1 Reference—API V1.<https://docs.huinoo.com/openstack/archive/api/openstack-object-storage/1.0/os-objectstorage-devguide-1.0.pdf>.2014. (Year: 2014).
Rivkind, Yael. Object Storage: Everything You Need to Know. <https://lakefs.io/blog/object-storage/>Nov. 25, 2020. (Year: 2020).
"Adding Objects to Versioning—Enabled Buckets", from https://docs.aws.amazon.com/AmazonS3/latest/dev/AddingObjectstoVersioningEnabledBuckets.html, (Oct. 2, 2019).
"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.
"AWS Pricing"; Amazon Web Services; https://aws.amazon.com/pricing/; Webpage accessed on Jun. 23, 2021; pp. 1-9.
"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.
"Configure a Pod to Use a ConfigMap", from https://kubernetes.io/docs/tasks/configure-pod-container/configure-pod-configmap/,(Oct. 2, 2019).
"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.
"Deployments", from https://kubernetes.io/docs/concepts/workloads/controllers/deployment/, (Oct. 2, 2019).
"How to use Indexing to Improve Database Queries," https://dataschool.com/sql-optimization/how-indexing-works/, pp. 1-12.
"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.
"Managed VMware Cloud Services"; VMware; https://cloud.vmware.com/providers/managed-services-provider; Webpage accessed on Jun. 23, 2021; pp. 1-5.
"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.
"Method:disks.get|Compute Engine Documentation|Google Cloud.pdf," https://cloud.google.com/compute/docs/reference/rest/v1/disks/get, pp. 1-17.
"NetApp ONTAP 9.7 Announced—StorageReview.com," (Jun. 14, 2019), https://www.peakresources.com/netapp-ontap-9-6-release-notes-and-thoughts/, pp. 1-5.
"Nutanix Solution for Service Providers"; Nutanix, Inc. Solution Briet; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.
"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.
"PUT Object|Cloud Storage|Google Cloud," https://cloud.google.com/storage/docs/xml-api/put-object, pp. 1-3.

(56) References Cited

OTHER PUBLICATIONS

"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"Retrieving Object Versions", from https://docs.aws.amazon.com/AmazonS3/latest/dev/RetrievingObjectVersions.html, (Oct. 2, 2019).
"Set up Cluster Federation with Kubefed—Kubernetes", from https://v1-14.docs.kubernetes.io/docs/tasks/federation/set-up-cluster-federation-kubefed/, (Apr. 17, 2020).
"Storage Tiering"; VMWARE Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.
"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
"Volumes", from https://kubernetes.io/docs/concepts/storage/volumes/, (Oct. 2, 2019).
"XML and More: OCI?Knowing Object Storage Basics" (Jan. 13, 2019), http://xmlandmore.blogspot.com/2019/01/ociknowing-object-storage-basics.html, pp. 1-6.
Amazon S3, "Adding objects to versioning-enabled buckets," https://docs.aws.amazon.com/AmazonS3/latest/userguide/AddingObjectstoVersioningEnabledBuckets.html.
Amazon S3, "Retrieving object versions from a versioning-enabled bucket," https://docs.aws.amazon.com/AmazonS3/latest/userguide/RetrievingObjectVersions.html.
Amazon Simple Storage Service User Guide API Version Mar. 1, 2006 (Year: 2006).
B Tree Indexes. http://web.csulb.edu/-amonge/classes/common/db/B TreeIndexes.html, Aug. 4, 2018, pp. 1-7 (2018).
Ballard, Brit, "Back to Basics: Writing SQL Queries," (Apr. 21, 2014), https://thoughtbot.com/blog/back-to-basics-sql, 1-17 pages.
Cano, Ignacio, et al. "Curator: Self-Managing Storage for Enterprise Clusters" (Mar. 27, 2017), from https://www.usenix.org/conference/nsdi17/.
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Gowri Balasubramanian; "Should Your DynamoDB Table be Normalized or Denormalized?"; AWS Database Blog; https://aws.amazon.com/blogs/database/should-your-dynamodb-table-be-normalized-or-denormalized/; Dec. 5, 2016; pp. 1-5.
Guess A.R., "Cloudian HyperStore 7 Multi-Cloud Data Management Unifies Public Cloud and On-Premises Storage—DATAVERSITY," (Jan. 29, 2018), https://www.dataversity.net/cloudian-hyperstore-7-multi-cloud-data-management-unifies-public-cloud-premises-storage/, pp. 1-4.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug.-Dec. 2015; pp. 1-6.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697-09 Jul. 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy, "Sonobuoy," https://sonobuoy.io/, 1-6 pages.
Stopford. Log Structured Merge Trees. http://www.benstopford.com/2015/02/14/ log-structured-merge-trees, 2015, pp. 1-8 (2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.

(56) References Cited

OTHER PUBLICATIONS

VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wambler, Choosing a Primary Key: Natural or Surrogate? http://www.agiledata.org/essays/keys.html, 2018, pp. 1-4 (2018).
Wikipedia, "Chunked transfer encoding," https://en.wikipedia.org/wiki/Chunked_transfer_encoding, pp. 1-4/.
Woodward Liz, "What is Elastic Cloud Storage—A Guide to ECS in 2022," https://www.cloudwards.net/what-is-elastic-cloud-storage/, pp. 1-8.

\* cited by examiner

SYSTEM AND METHOD OF VM RECOVERY ON S3 COMPATIBLE OBJECT STORAGE

CROSS-REFERENCE TO RELATED APPLICATION

This application is related to and claims priority under 35 U.S. § 119(e) from U.S. Provisional Application No. 63/144,238, filed Feb. 1, 2021, titled "SYSTEM AND METHOD OF VM RECOVERY ON S3 COMPATIBLE OBJECT STORAGE," the entire contents of which are incorporated herein by reference for all purposes.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a non-transitory computer readable medium is disclosed. In some embodiments, the non-transitory computer readable medium includes instructions when executed by a processor cause the processor to expose, to a client, an immutable object as a volume. In some embodiments, the non-transitory computer readable medium includes instructions when executed by a processor cause the processor to manage local access to a portion of the immutable object. In some embodiments, the client locally accesses the portion of the immutable object as a block of the volume.

In some embodiments, the non-transitory computer readable medium includes instructions when executed by a processor cause the processor to receive a block protocol request to read, from the immutable object exposed as a volume, an object chunk exposed as a block of the volume. In some embodiments, the block protocol request indicates the block. In some embodiments, the non-transitory computer readable medium includes instructions when executed by a processor cause the processor to read, from the immutable object, the object chunk using an object protocol request to read the object chunk. In some embodiments, the non-transitory computer readable medium includes instructions when executed by a processor cause the processor to translate the block protocol request to the object protocol request.

In some embodiments, the non-transitory computer readable medium includes instructions when executed by a processor cause the processor to receive a block protocol request to write data to a first object chunk of the immutable object. In some embodiments, the first object chunk is exposed as a block of the volume. In some embodiments, the block protocol request indicates the block. In some embodiments, the non-transitory computer readable medium includes instructions when executed by a processor cause the processor to write, to a second object chunk of a second immutable object, the data using an object protocol request to write the data to the second object chunk of the second immutable object. In some embodiments, the non-transitory computer readable medium includes instructions when executed by a processor cause the processor to map the block to the second object chunk of the second immutable object. In some embodiments, the non-transitory computer readable medium includes instructions when executed by a processor cause the processor to translate the block protocol request to the object protocol request.

In some embodiments, the non-transitory computer readable medium includes instructions when executed by a processor cause the processor to select a virtual machine (VM) to recover. In some embodiments, the VM is associated with a snapshot. In some embodiments, the snapshot is the immutable object. In some embodiments, the non-transitory computer readable medium includes instructions when executed by a processor cause the processor to launch the VM using an endpoint of the volume. In some embodiments, the non-transitory computer readable medium includes instructions when executed by a processor cause the processor to select a host in which to launch the VM. In some embodiments, the non-transitory computer readable medium includes instructions when executed by a processor cause the processor to expose the volume on a hypervisor of the selected host.

In accordance with some aspects of the present disclosure, an apparatus is disclosed. In some embodiments, the apparatus includes a processor and a memory. In some embodiments, the memory includes programmed instructions that, when executed by the processor, cause the apparatus to expose, to a client, an immutable object as a volume. In some embodiments, the memory includes programmed instructions that, when executed by the processor, cause the apparatus to manage local access to a portion of the immutable object. In some embodiments, the client locally accesses the portion of the immutable object as a block of the volume.

In accordance with some aspects of the present disclosure, a method is disclosed. In some embodiments, the method includes exposing, to a client, an immutable object as a volume. In some embodiments, the method includes managing local access to a portion of the immutable object. In some embodiments, the client locally accesses the portion of the immutable object as a block of the volume.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
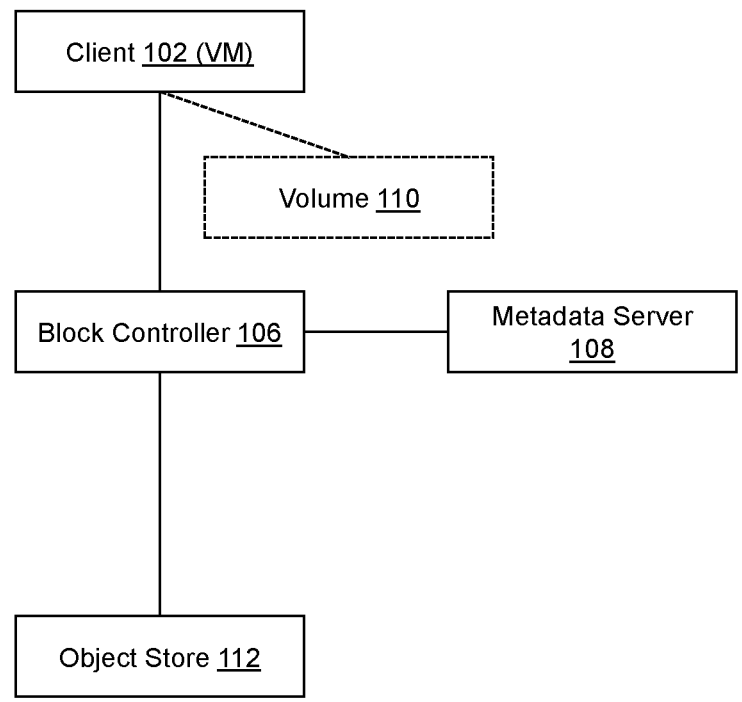
FIG. 1 is an example block diagram of an environment, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A workload, such as one or more virtual machines (VMs), containers, or applications, in a virtualized environment can be configured to run software-defined object storage service for accessing an object store, which may include one or more objects. The objects may include one or more of unstructured data, structured data, a file, a document, a spreadsheet, a video, a data, metadata, a combination thereof, etc.

In some embodiments, the object store may be integrated with, or run on top of, a hyper-converged infrastructure (HCI) of a cluster of nodes (e.g., hosts, computers, machines). Each cluster may include multiple virtualized workloads (one or more virtual machines, containers, etc.) that run services/applications/operating systems by using storage and compute resources virtualized through a hypervisor (e.g., ESXi, KVM, Hyper-V, etc.) and distributed across the cluster. The cluster of nodes may be in one data center (on-premises), in a cloud (off-premises), or distributed across one or more of multiple data centers, multiple clouds, or a hybrid of data centers and clouds. At least one of the workloads (e.g., a controller virtual machine or container) in the cluster or one of the hypervisors may run core services that manages and maintains the cluster or the workloads. The core services may include a cluster manager, a health/wellness check manager, an I/O storage manager, and the like. In some embodiments, the core services manage multiple clusters.

Object storage has become a popular choice for storing massive amounts of backup data. However, some hypervisors or other clients are not able to access the object store directly because such clients have not been programmed to execute or generate instructions in accordance with an object storage protocol. In embodiments lacking the improvements described herein, operations such as recovering the backup to VMs rely on a third-party software vendor, which copy and transfer the data from object storage to an image store that can be deployed in customers' data centers and launch the VM from the image. Copying and transferring data to an image store causes storage silos and customers have to deal with multiple service-level agreements (SLAs) with unpredictable performance and behavior. In addition, copying unnecessarily to storage before recovering VMs extends the time to recover the VMs. The delay is exacerbated when recovering hundreds of VMs in one batch.

Disclosed herein are embodiments that expose data stored in object storage over protocols such as internet small computer storage (iSCSI) protocol. The data can be exposed on any client (i.e., a VM, a Nutanix box, a laptop). This may require doing translations, for example, if the mapping from the object storage to the VM disk format is not one-to-one. Embodiments of the system and method disclosed herein enable instant recovery. In embodiments disclosed herein, the secondary/backup storage (as opposed to primary storage side) manage orchestration and, therefore, may be agnostic to the compute resources and hypervisor on the primary storage side.

Disclosed herein are embodiments that can access the object store directly and perform operations like accessing reads/writes or restoring VMs from the object store without intervention by third-party vendors or unnecessarily copying data. In some embodiments, a block controller exposes the object store as one or more volumes to the client. The block controller can receive instructions from the client to access the volume, translate instructions from a block storage protocol to an object storage protocol, and send the instructions to the object store. Advantageously, embodiments disclosed herein can reduce latency associated with executing operations such as read/write access or VM recovery. Moreover, embodiments disclosed can herein consolidate data into one storage space with one corresponding SLA. Advantageously, embodiments disclosed herein allow scaling. Object storage, as contemplated by the embodiments herein, can go beyond hundreds of Petabytes and billions of LUNs, which may not be possible with traditional object storage vendors.

A limitation with object storage is that objects are immutable—they can only be written to once. On the other hand, blocks can be modified/written to incrementally. One challenge in exposing the object store as one or more volumes is that, without further improvements, the client cannot modify an object exposed as a volume.

Disclosed herein are embodiments that can perform redirect-on-write and store new data on a local store keeping object storage data immutable. In some embodiments, the redirect-on-write operation straddles (e.g., translates between or uses both of) two access protocols for primary and secondary storage.

Disclosed herein are embodiments that allow the client to modify the object exposed as a volume. In some embodiments, the block controller or other component creates a second object and remaps a block of the volume from the object to the second object. Then, the block controller can write an incremental change to the second object as if the block of the volume is being rewritten. Advantageously, embodiments herein retain the feature of blocks being rewritable while storing the data as immutable objects.

FIG. 1 is an example block diagram of an environment 100, in accordance with some embodiments of the present disclosure. In some embodiments, the environment 100 is a host (e.g., node, machine, computer), a cluster of hosts, a site, etc. The environment 100 includes a client 102. The client 102 may be a virtual machine, a container, a pod, a hypervisor, etc. The client 102 is coupled to a block controller 106 such as an internet small computer storage (iSCSI) controller. The block controller 106 is coupled to an object store 112 such as an off-premises network-accessible object storage facility that may include AWS simple storage service (S3). In some embodiments, the block controller 106 is coupled to the object store 112 via an object controller or other object store interface.

The block controller 106 exposes the object store 112 to the client 102 as a volume 110 such as a unit of data storage, a logical unit (LUN), an iSCSI LUN, etc. The block controller 106 can manage/orchestrate operations/processes/sequences that access the object store 112 such as I/O requests, data access, reads, writes, data/workload recovery, etc. The management by the block controller 106 can be agnostic to compute resources and hypervisors of the client or any other client (e.g., site/cluster/host/third party).

In some embodiments, the block controller 106 is coupled to a metadata server 108. In some embodiments, the block controller 106 maps/translates/converts an input/output (I/O) request according to a block protocol (e.g., iSCSI protocol) to a second input/output (I/O) request according to an object protocol (e.g., S3 protocol). In some embodiments, the metadata server 108 includes a mapping (e.g., raw device mapping) of blocks to objects or object chunks. The block controller 106 may send an address of a block to the metadata server 108. The metadata server 108 may look up/determine the object or object chunk address mapped from the block address and send the object address to the block controller 106. The block controller 106 may access the object store 112 using the object-based I/O request.

In some embodiments, an object controller or other interface of the object store 112 sends a response to the I/O request to the block controller 106. If the I/O request is a request to read, the response can include the data. If the I/O request is a request to write, the response can include an acknowledgment that the data was written and/or an address of an object or object chunk to which the data was written to. In some embodiments, the block controller 106 translates the object-based response to a block-based response. The block controller 106 may access the block-object address mapping from a local cache or from the metadata server 108. The block controller 106 may send an updated object address to the metadata server 108. The metadata server 108 may update the mapping based on the updated address.

Figure 2:
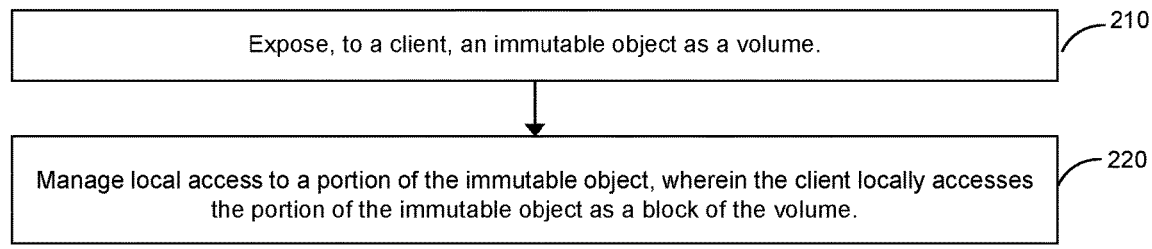
FIG. 2 is a flowchart of an example method is illustrated, in accordance with some embodiments of the present disclosure.

Referring now to FIG. 2, a flowchart of an example method 200 is illustrated, in accordance with some embodiments of the present disclosure. The method 200 may be implemented using, or performed by, the environment 100, one or more components of the environment 100, a processor associated with the environment 100, or a processor associated with the one or more components of environment 100. Additional, fewer, or different operations may be performed in the method 200 depending on the embodiment.

A processor (e.g., the block controller 106) exposes, to a client (e.g., the client 102), an immutable object as a volume (e.g., the volume 110) (at operation 210). The immutable object may be stored in the object store (e.g., the object store 112). The processor manages local access to the immutable object or a portion (e.g., object chunk) of the immutable object (at operation 220). The portion of the immutable object may be specified in a request by the client. In some embodiments, the client locally accesses the portion of the immutable object as a block of the volume. In some embodiments, the client locally accesses the portion of the immutable object as a block of the volume responsive to, or based on, the processor managing the local access.

The processor may manage local access to the immutable object, or portion thereof, irrespective of a first configuration of the client. For example, the client can include a hypervisor that is not able to generate or send object-based I/O requests. In some embodiments, the processor manages access to the object store irrespective of a second configuration of a second client having second access to the object store. For example, if a source cluster stores data in the object store using a third-party service, the processor manages access to the data in the object store irrespective of what kind of hypervisor or compute resources the second cluster or third party has.

In some embodiments, managing access to the immutable object includes receiving a block-based I/O request, translating the block-based I/O request to an object-based I/O request, and accessing the data using the object-based I/O request. In some embodiments, the volume is an iSCSI LUN. In some embodiments, the block-based I/O request is an I/O request according to iSCSI protocol. In some embodiments, the object-based I/O request is an I/O request according to S3 protocol. The I/O request can be a request to read or write the immutable object, or portion thereof.

Figure 3:
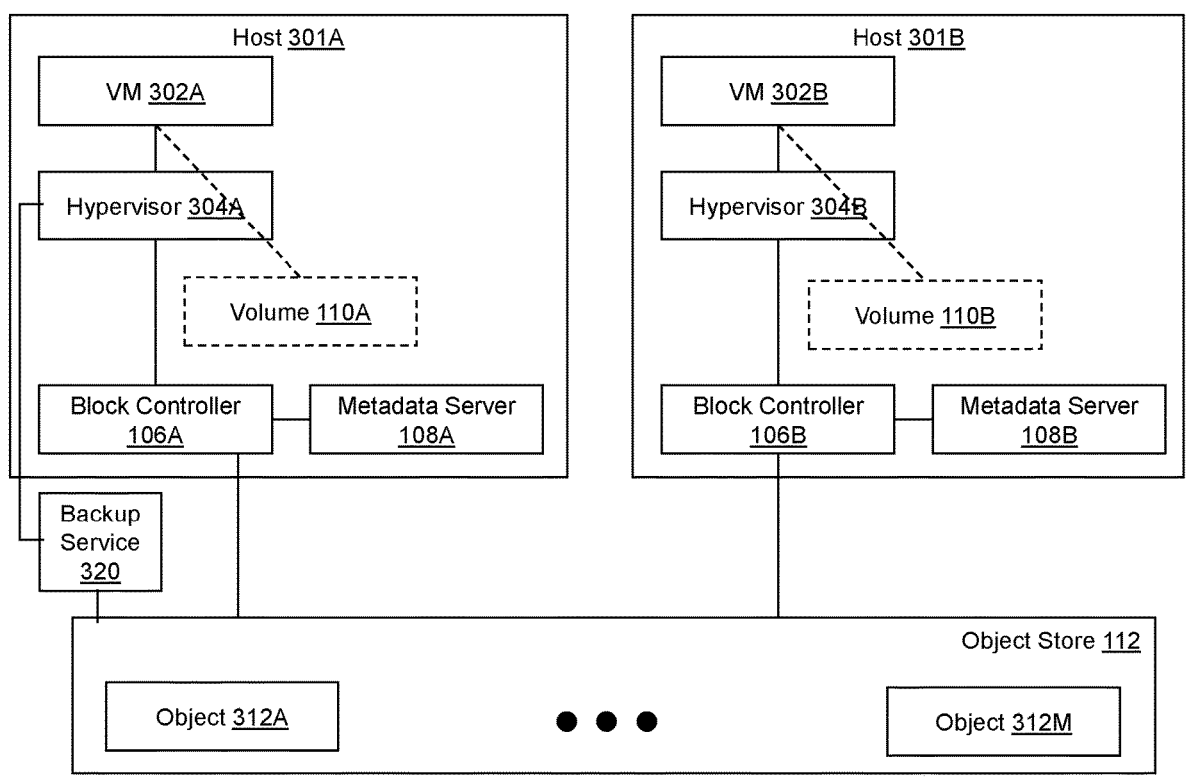
FIG. 3 is an example block diagram of an environment for recovering a backup virtual machine, in accordance with some embodiments of the present disclosure.

FIG. 3 is an example block diagram of an environment 300 for recovering a backup virtual machine, in accordance with some embodiments of the present disclosure. The environment 300 includes a host 301A, a host 301B and an object store 112 coupled to the host 301A and the host 301B. The host 301A includes one or more VMs including the VM 302A. The host 301A includes a hypervisor 304A coupled to the VM 302A, a block controller 106A coupled to the hypervisor 304A, and a metadata server 108A coupled to the block controller 106A. Like the host 301A, the host 301B includes one or more VMs, a hypervisor 304B, a block controller 106B, and a metadata server 108B.

In some embodiments, the block controller 106A exposes the object store 112 to the VM 302A and/or the hypervisor 304A as one or more volumes such as the volume 110A. The block controller 106B exposes the object store 112 to the one or more VMs in the host 301B and/or the hypervisor 304B as one or more volumes such as the volume 110B. In some embodiments, the object store 112 is distributed across multiple hosts including the host 301A and the host 301B. The object store 112 includes multiple objects (e.g., objects 312A-312M).

In some embodiments, one or more components of the host 301B detects/determines that one or more snapshots (e.g., available snapshots, backups, available backups) are stored in the object store 112. In some embodiments, one or more components of the host 301B select the snapshot of VM 302A. In some embodiments, one or more components of the host 301B triggers a recovery process.

The VM 302A or other VM may send to the block controller 106A a request to back up the VM 302A (e.g., a snapshot/image of a VM) from a source location (e.g., a memory, a locally-attached storage, a network-attached storage, a persistent block-based storage) to the object store 112. Additionally or alternatively, the VM 302A or other VM may send a request to back the VM 302A to a backup service 320 (e.g., Hycu). The block controller 106A, the backup service 320 or some interface of the object store 112 can write/append the snapshot to one of the objects such as the object 312A.

In some embodiments, a VM on the host 301B or the hypervisor 304B recovers the VM 302A from the snapshot in the object 312A. The recovered instance of the VM 302A may be in the host 301B and may be referred to as VM 302B. In some embodiments, a VM on the host 301B or the hypervisor 304B launches the VM 302B from the snapshot. In some embodiments, the VM 302B or another component of the host 301B requests to read the snapshot in the object 312A. The VM or hypervisor 304B can send a read request according to a block storage protocol. The block controller 106B can translate/map the second read request to a second recovery request according to an object storage protocol and send the second read request to the object store 112.

In some embodiments, the environment 300 is an instance of the environment 100 of FIG. 1. In some embodiments, the volumes 110A-110B are instances of the volume 110 of FIG. 1. In some embodiments, the block controllers 106A-106B are instances of the block controller 106 of FIG. 1. In some embodiments, the metadata servers 108A-108B are instances of the metadata server 108 of FIG. 1.

Figure 4:
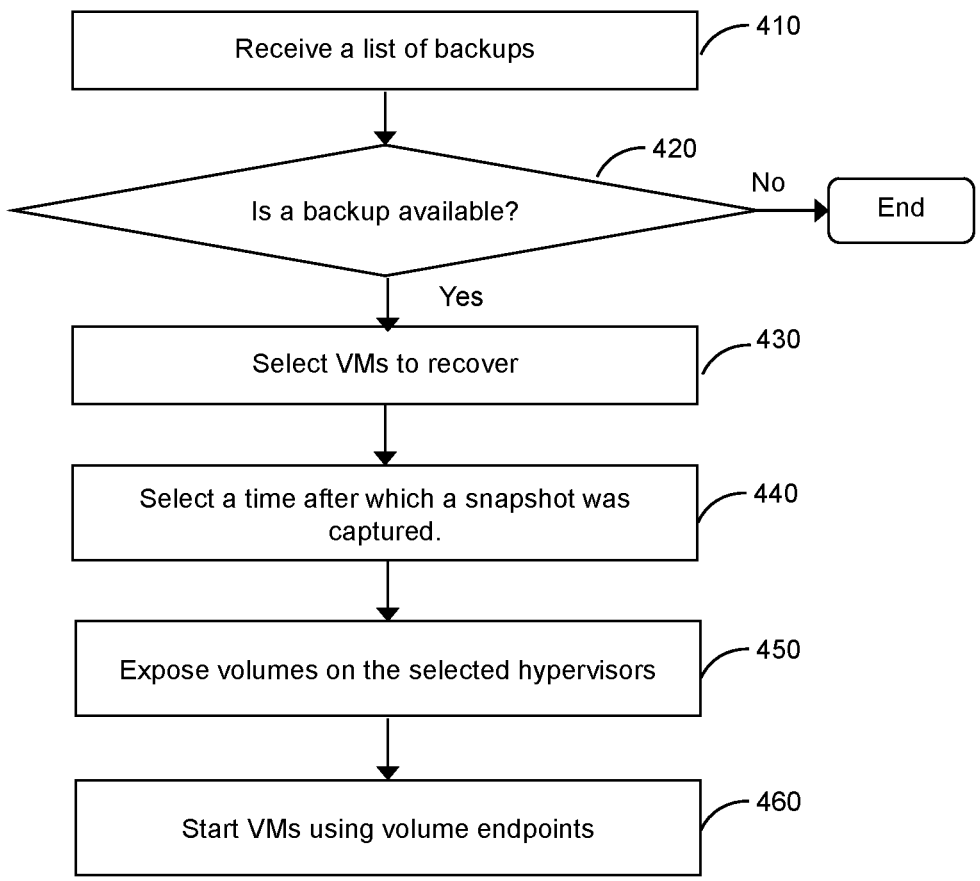
FIG. 4 is a flowchart of an example method is illustrated, in accordance with some embodiments of the present disclosure.

Referring now to FIG. 4, a flowchart of an example method 400 is illustrated, in accordance with some embodiments of the present disclosure. The method 400 may be implemented using, or performed by, the environment 100/300, one or more components of the environment 100/300, a processor associated with the environment 100/300, or a processor associated with the one or more components of environment 100/300. Additional, fewer, or different operations may be performed in the method 400 depending on the embodiment. One or more operations or other embodiments of the method 400 may be combined with one or more operations or other embodiments of the method 200.

A processor (e.g., the block controller 106B, one or more components of the host 301B, etc.) receives a list of backups (e.g., VM backups, snapshots, etc.) (at operation 410). The processor determines if a backup of the list of backups is available (at operation 420). In response to determining that the processor determines that a backup is not available, the method 400 ends. In response to determining that the processor determines that a backup is available, the processor selects a VM to recover (at operation 430).

The processor selects a time after which a snapshot of the VM was captured (at operation 440). In some embodiments, the snapshot is a most recent snapshot with respect to the select time. The snapshot may be stored as an immutable object in an object store (e.g., the object store 112). In some embodiments, the processor selects a hypervisor or a host. The processor exposes volumes on the selected hypervisors (at operation 450). The processor starts/launches VMs using a volume (e.g., iSCSI) endpoint (at operation 460).

Figure 5:
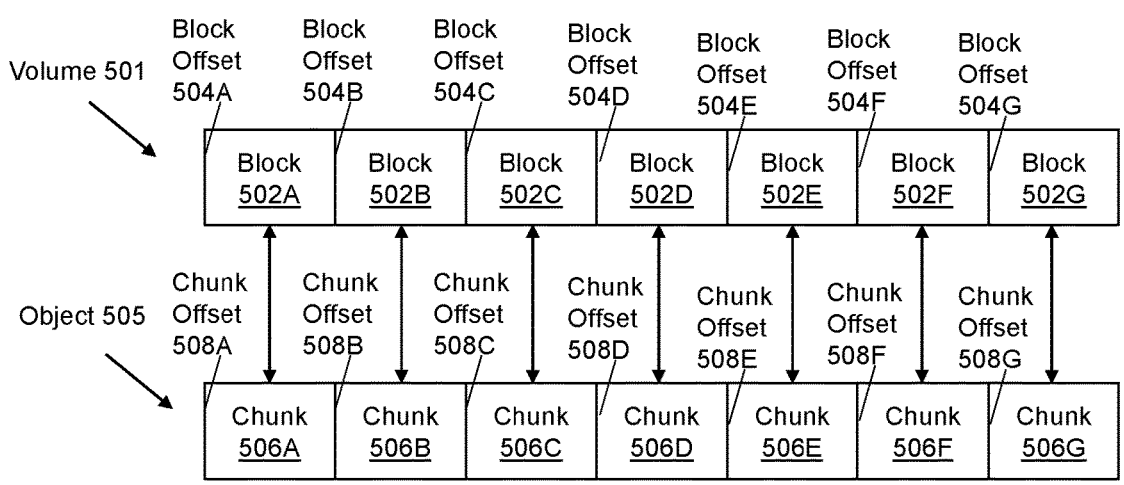
FIG. 5 is an example block diagram of a mapping between a representation of a volume and an object, in accordance with some embodiments of the present disclosure.

FIG. 5 is an example block diagram of a mapping 500 between a representation of a volume 501 and an object 505, in accordance with some embodiments of the present disclosure. The representation of the volume 501 includes representations of multiple blocks 502A, 502B, 502C, 502D, 502E, 502F, and 502G. Each block starts at a different block offset. For example, block 502A starts at the block offset 504A, block 502B starts at the block offset 504B, block 502C starts at the block offset 504C, block 502D starts at the block offset 504D, block 502E starts at the block offset 504E, block 502F starts at the block offset 504F, and block 502G starts at the block offset 504G.

The object 505 includes multiple object chunks 506A, 506B, 506C, 506D, 506E, 506F, and 506G. Each object chunk starts at a different object chunk offset. For example, object chunk 506A starts at the object chunk offset 508A, object chunk 506B starts at the object chunk offset 508B, object chunk 506C starts at the object chunk offset 508C, object chunk 506D starts at the object chunk offset 508D, object chunk 506E starts at the object chunk offset 508E, object chunk 506F starts at the object chunk offset 508F, and object chunk 506G starts at the object chunk offset 508G.

The mapping 500 can be any schema or data structure. For example, the mapping 500 is embodied as a table having rows corresponding to each representation of a block and a column corresponding to the object chunk that maps to the respective representation of a block. The mapping 500 may include additional columns corresponding to a block offset, an object chunk offset, a block identifier, a virtual disk identifier, an object identifier, and the like. The mapping 500 may be stored in memory or storage associated with or integrated in the metadata server 108. In one example, the block 502A maps to the object chunk 506A, the block 502B maps to the object chunk 506B, the block 502C maps to the object chunk 506C, the block 502D maps to the object chunk 506D, the block 502E maps to the object chunk 506E, the block 502F maps to the object chunk 506F, and the block 502G maps to the object chunk 506G.

Figure 6:
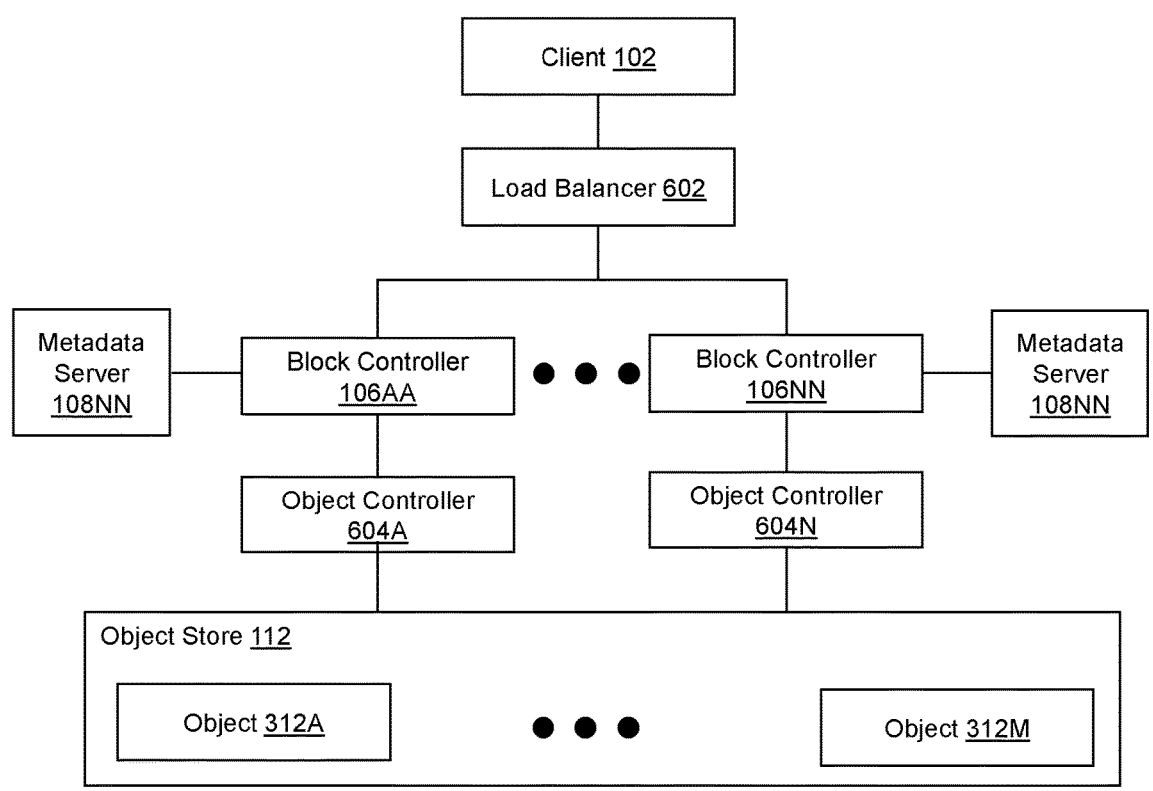
FIG. 6 is an example block diagram of an environment of the object store, in accordance with some embodiments of the present disclosure.

FIG. 6 is an example block diagram of an environment 600 of the object store 112, in accordance with some embodiments of the present disclosure. The environment 600 includes a client 102, a load balancer 602 coupled to the client 102, and multiple block controllers 106AA-106NN coupled to the load balancer 602. Each block controller is coupled to a corresponding metadata server and object controller. For example, the block controller 106AA is coupled to the metadata server 108AA and the object controller 604A. In some embodiments, each set of block controller, metadata server, and object controller are in a respective host. Each of the object controllers 604A-604N is coupled to the object store 112.

In some embodiments, the environment 600 is an instance of the environment 100. In some embodiments, the block controllers 106AA-106NN are instances of the block controller 106 of FIG. 1. In some embodiments, the metadata servers 108AA-108NN are instances of the metadata server 108 of FIG. 1.

Figure 7:
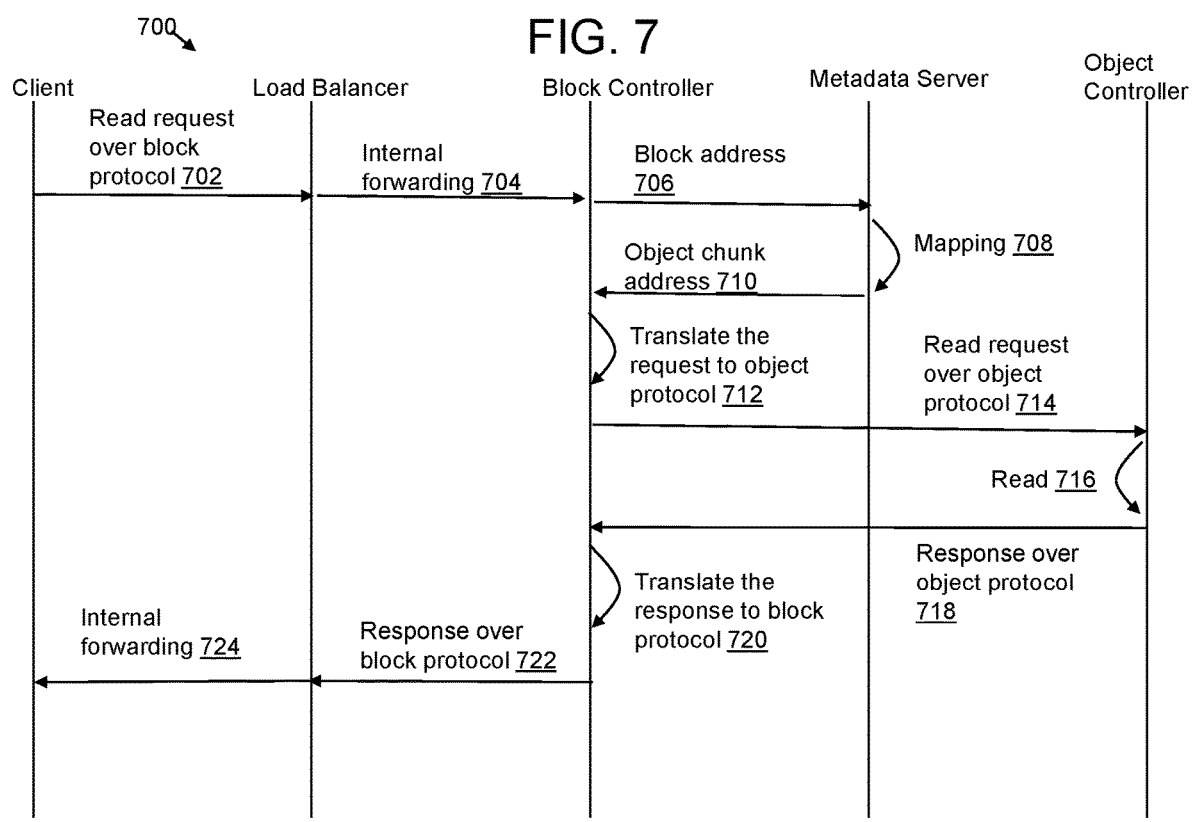
FIG. 7 is an example swim lane diagram of a process for read access of the object store, in accordance with some embodiments of the present disclosure.

FIG. 7 is an example swim lane diagram of a process 700 for read access of the object store 112, in accordance with some embodiments of the present disclosure. At operation 702, the client 102 sends a read request over block protocol to the load balancer 602. In some embodiments, the load balancer 602 selects a block controller having, or corresponding to, a lowest central processing unit (CPU) usage or highest availability (e.g., the block controller 106AA). At operation 704, the load balancer 602 forwards the read request to the block controller 106AA. At operation 706, the block controller 106AA sends, to the metadata server 108AA, a block address of data to be read according to the request.

At operation 708, the metadata server 108AA maps the block address to an object or object chunk address. At operation 710, the metadata server 108AA sends the object or object chunk address to the block controller 106AA. At operation 712, the block controller 106AA translates the read request from a block protocol to an object protocol. For example, the block controller 106AA specifies the object-based read request using the object or object chunk address mapped from the block address used in the block-based read request. The block controller 106AA may change a format of the object-based read request to a second format of the block-based read request.

At operation 714, the block controller 106AA sends the object-based read request to the object controller 604A. At operation 716, the object controller 604A reads the data from the object store 112 using object protocol. At operation 718, the object controller 604A sends a response over object protocol to the block controller. At operation 720, the block controller translates the response to a block protocol. At operation 722, the block controller 106AA sends the response over block protocol to the load balancer 602. At operation 724, the load balancer 602 forwards the response to the client 102.

Figure 8:
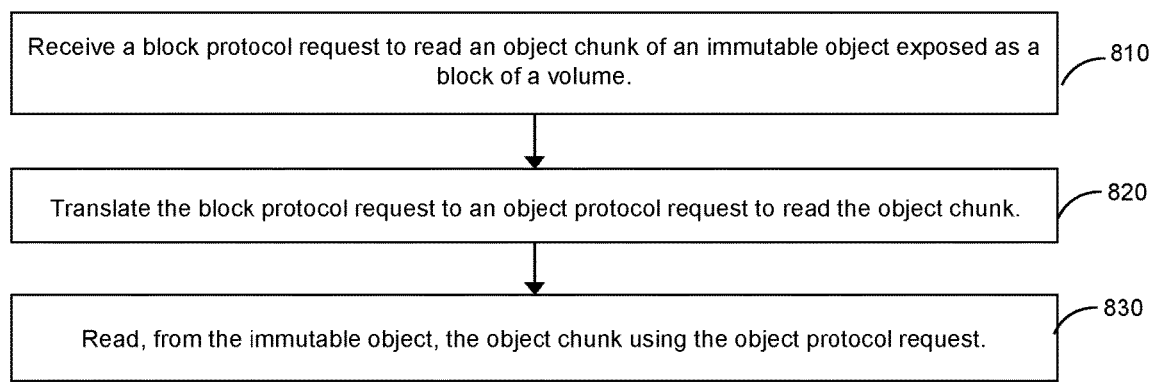
FIG. 8 is a flowchart of an example method is illustrated, in accordance with some embodiments of the present disclosure.

Referring now to FIG. 8, a flowchart of an example method 800 is illustrated, in accordance with some embodiments of the present disclosure. The method 800 may be implemented using, or performed by, the environment 100/300/600, one or more components of the environment 100/300/600, a processor associated with the environment 100/300/600, or a processor associated with the one or more components of environment 100/300/600. Additional, fewer, or different operations may be performed in the method 800 depending on the embodiment. One or more operations or other embodiments of the method 800 may be combined with one or more operations or other embodiments of one or more of the methods 200 and 400.

A processor (e.g., the block controller 106AA) receives a block protocol request to read, from an immutable object exposed as a volume, an object chunk (e.g., object chunk 506A of the object 505) exposed as a block (e.g., block 502A) of the volume (at operation 810). The immutable object may be stored in an object store (e.g., the object store 112). In some embodiments, the block protocol request indicates the block (e.g., a block address). The block protocol request may include a block offset (e.g., the block offset 504A). The processor may receive the block protocol request from a client (e.g., the client 102). The processor translates the block protocol request to an object protocol request to read the object chunk (at operation 820). In some embodiments, the processor maps the block offset to an object chunk offset (e.g., chunk offset address). The processor reads, from the immutable object, the object chunk using the object protocol request (at operation 830).

In some embodiments, a second client created the object (e.g., wrote the object to the object store). In some embodiments, the object store includes a second object, and the client has access to the object but not the second object. In some embodiments, an administrator gives the client access to the object but not the second object. In other words, in some embodiments, the client only has access to a first portion of data (objects) in the object store and not a second portion of data (objects) in the object store. In some embodiments, reading the object chunk causes a VM to be launched or restored on a host of the client.

Figure 9:
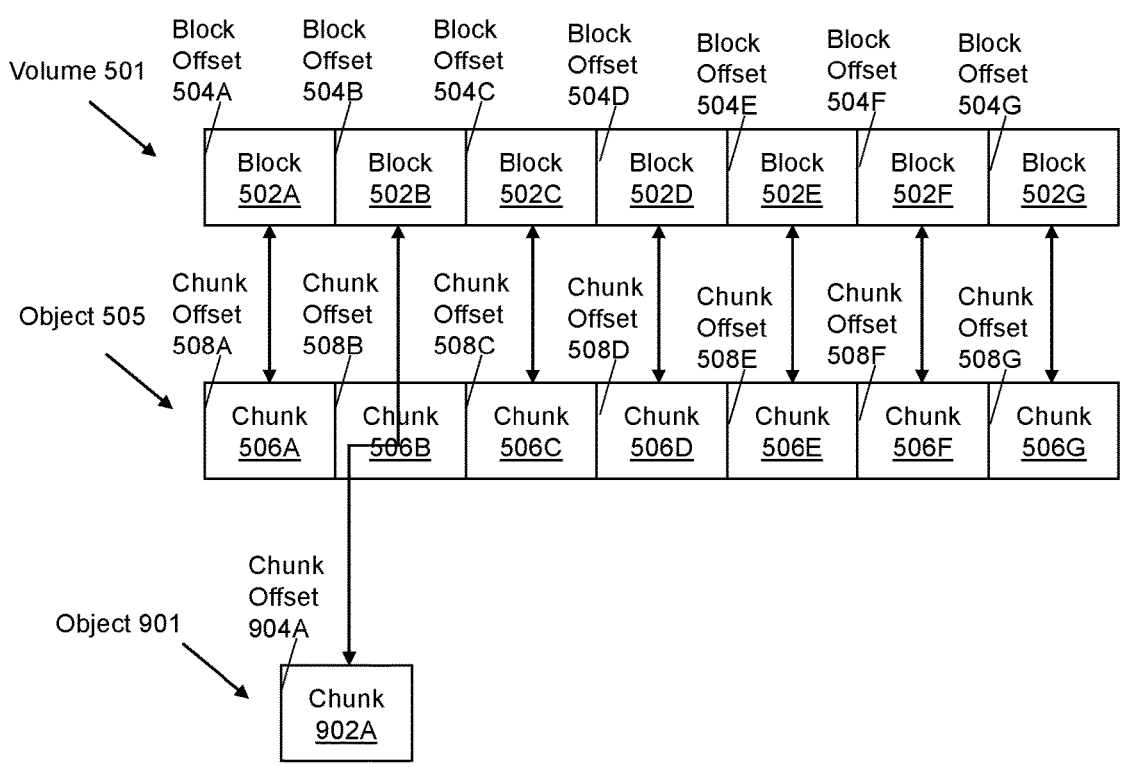
FIG. 9 is an example block diagram of a mapping between a representation of a volume and a combination of an object and an object, in accordance with some embodiments of the present disclosure.

FIG. 9 is an example block diagram of a mapping 900 between a representation of a volume 501 and a combination of an object 505 and an object 901, in accordance with some embodiments of the present disclosure. The mapping 900 is similar to the mapping 500 of FIG. 5 except that the mapping 900 reflects a remapping that occurs after a client "rewrites" the object 505 exposed as the volume 501. For example, the client sends a request to write to the block offset 504B. In response, the object 901 is created, the change to the chunk 506B is mapped from the block 502B, and the change to chunk 506B is written as a chunk 902A of the object 901. The chunk 902A may have a chunk offset 904A. Then, the mapping 500 is updated to the mapping 900. The mapping 900 maps the block 502B to the chunk 902A. In some embodiments, volume 501 is an instance of volume 110 and object 505 is an instance of object 312A.

Figure 10:
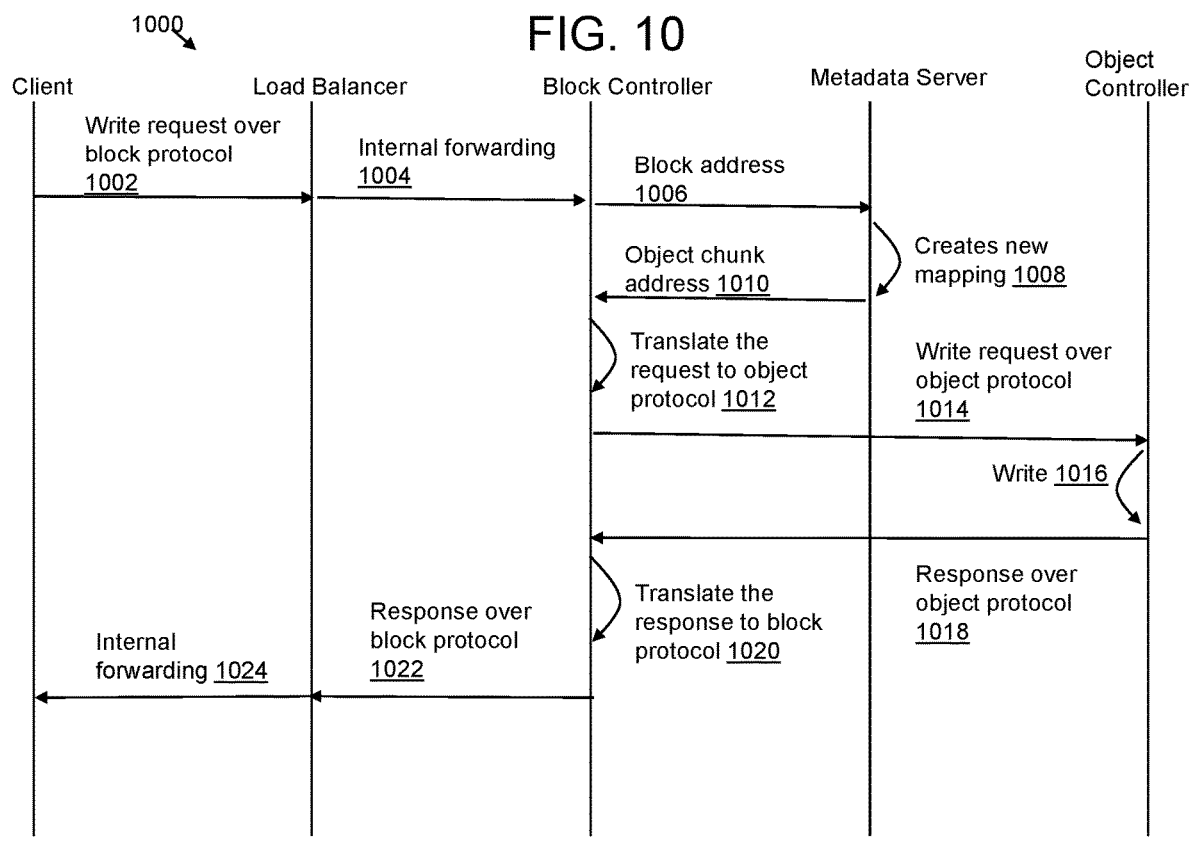
FIG. 10 is an example swim lane diagram of a process for write access of the object store, in accordance with some embodiments of the present disclosure.

FIG. 10 is an example swim lane diagram of a process 1000 for write access of the object store 112, in accordance with some embodiments of the present disclosure. At operation 1002, the client 102 sends a write request over block protocol to the load balancer 602. At operation 1004, the load balancer 602 forwards the read request to the block controller 106AA. At operation 1006, in some embodiments, the block controller 106AA sends to the metadata server 108AA a block address of data to be written according to the request. In some embodiments, the block controller 106AA sends an indication that the request is a request to write data. In some embodiments, the block controller 106AA specifies that the write is at the block address.

At operation 1008, the metadata server 108AA creates a new mapping from the block address to an object or object chunk address. At operation 1010, the metadata server 108AA sends the object or object chunk address to the block controller 106AA. At operation 1012, the block controller 106AA translates the write request from a block protocol to an object protocol. For example, the block controller 106AA specifies the object-based write request using the object or object chunk address mapped from the block address used in the block-based write request. The block controller 106AA may change a format of the object-based write request to a second format of the block-based write request.

At operation 1014, the block controller 106AA sends the object-based write request to the object controller 604A. In some embodiments, at operation 1016, the object controller 604A writes the data to the object store 112 using object protocol. Alternatively or additionally, in some embodiments, at operation 1016, the object controller 604A writes the data to a temporary store. The temporary store may be used to store data (e.g., temporary user data) during serving write requests. The data may then be batched before writing the data into the object store 112.

At operation 1018, the object controller 604A sends a response over object protocol to the block controller. At operation 1020, the block controller translates the response to a block protocol. At operation 1022, the block controller 106AA sends the response over block protocol to the load balancer 602. At operation 1024, the load balancer 602 forwards the response to the client 102.

Figure 11:
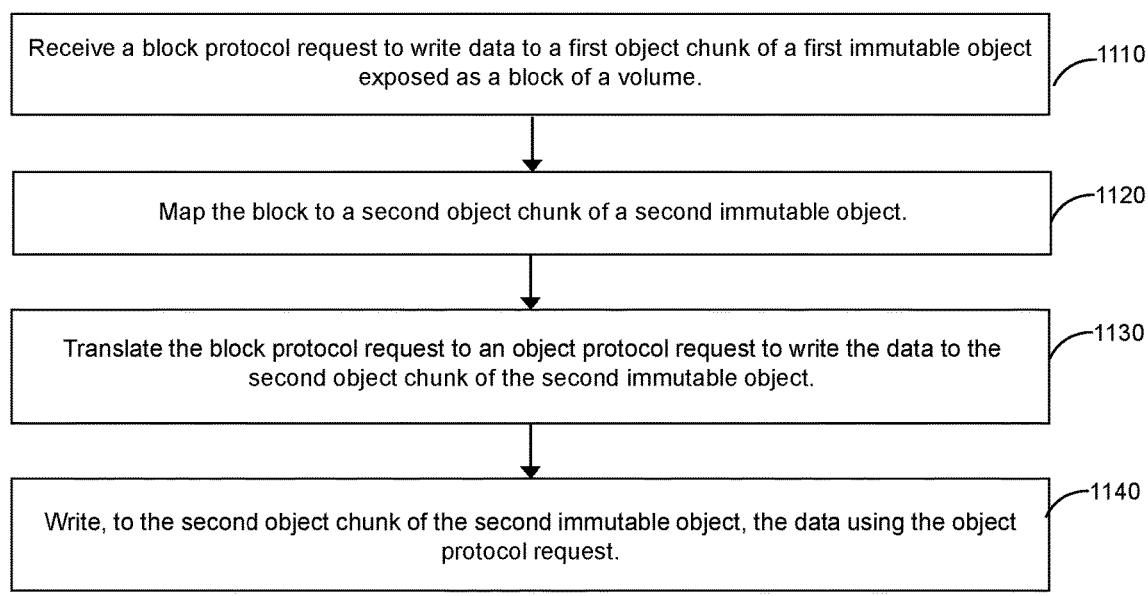
FIG. 11 is a flowchart of an example method is illustrated, in accordance with some embodiments of the present disclosure.

Referring now to FIG. 11, a flowchart of an example method 1100 is illustrated, in accordance with some embodiments of the present disclosure. The method 1100 may be implemented using, or performed by, the environment 100/300/600, one or more components of the environment 100/300/600, a processor associated with the environment 100/300/600, or a processor associated with the one or more components of environment 100/300/600. Additional, fewer, or different operations may be performed in the method 1100 depending on the embodiment. One or more operations or other embodiments of the method 1100 may be combined with one or more operations or other embodiments of one or more of the methods 200, 400, or 800.

A processor (e.g., the block controller 106AA, a metadata server 108AA, or a combination thereof) receives a block protocol request to write data to a first object chunk (e.g., object chunk 506B) of a first immutable object (e.g., object 505, the immutable object of FIG. 2) (at operation 1110).

The first object chunk of the first immutable object may be exposed as a block (e.g., block 502B) of a volume (e.g., volume 501). The first immutable object may be stored in an object store (e.g., the object store 112). The processor may receive the block protocol request from a client (e.g., the client 102). The processor maps the block to a second object chunk of a second immutable object (at operation 1120).

The processor translates the block protocol request to an object protocol request to write the data to the second object chunk of the second immutable object (at operation 1130). The second immutable object may be stored in a temporary/local store or the object store. The processor writes, to the second object chunk of the second immutable object, the data using the object protocol request (at operation 1140). The second object chunk of the second immutable object may be specifically created for writing the data from the block protocol request. The second object chunk of the second immutable object may be associated with available/unclaimed memory. In some embodiments, the temporary/local store is used to store data (e.g., temporary user data) during serving one or more write requests. After the one or more write requests have been served, data that is written to the temporary/local store is batched and written into the object store 112. The temporary/local store may be located on-premises (e.g., on one or more hosts of a cluster of hosts, e.g., on one of the hosts such as 301A or 301B) and separate from a cloud or remote server on which the object store 112 is located.

Each of the components (e.g., elements, entities) of the environments 100, 300, and 600 (e.g., the client 102, the block controller 106, the metadata server 108, the object store 112, the VM 302A, the hypervisor 304A, the load balancer 602, the object controller 604A), is implemented using hardware, software, or a combination of hardware or software, in one or more embodiments. Each of the components of the environments 100, 300, and 600 may be a processor with instructions or an apparatus/device (e.g., server) including a processor with instructions, in some embodiments. In some embodiments, multiple components may be part of a same apparatus and/or processor. Each of the components of the of the environments 100, 300, and 600 can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer readable medium comprising instructions that, when executed by a processor, cause the processor to:
   receive, from a client, a block protocol request to read data of a volume, wherein a snapshot stored as an immutable object in an object store is exposed to a client as the volume;
   select a virtual machine (VM) to recover, wherein the VM is associated with the snapshot;
   in response to the block protocol request to read the data of the volume, launch the VM from the snapshot using an endpoint of the volume by selecting a host of the client in which to launch the VM and exposing the immutable object as the volume on a hypervisor of the selected host; and
   manage local access to object chunks of the immutable object, such that the client locally accesses the object chunks of the immutable object as blocks of the volume by:
      receiving a block protocol request to write data to a first object chunk of the immutable object, wherein the block protocol request indicates a first block mapped to the first object chunk in a first mapping of blocks to object chunks;
      in response to the block protocol request to write data to the first object chunk:
         creating a second immutable object including a second object chunk;
         generating a second mapping of blocks to object chunks that maps the first block to the second object chunk;
         translating the block protocol request to an object protocol request indicating the second object chunk of the second immutable object; and
         writing, to the second object chunk of the second immutable object, the data using the object protocol request.

2. The medium of claim 1, comprising the instructions that, when executed by the processor, further cause the processor to:
   receive a block protocol read request indicating the first block; and
   read, from the immutable object, the second object chunk of the second immutable object using an object protocol read request to read the second object chunk.

3. The medium of claim 2, comprising the instructions that, when executed by the processor, further cause the processor to:
   map the first block to the second object chunk of the second immutable object; and
   translate the block protocol read request to the object protocol read request.

4. An apparatus comprising a processor and a memory, wherein the memory includes programmed instructions that, when executed by the processor, cause the apparatus to:
   receive, from a client, a block protocol request to read data of a volume, wherein a snapshot stored as an immutable object in an object store is exposed to a client as the volume;
   select a virtual machine (VM) to recover, wherein the VM is associated with the snapshot;
   in response to the block protocol request to read the data of the volume, launch the VM from the snapshot using an endpoint of the volume by selecting a host of the client in which to launch the VM and exposing the immutable object as the volume on a hypervisor of the selected host; and
   manage local access to object chunks of the immutable object, such that the client locally accesses the object chunks of the immutable object as blocks of the volume by:
      receiving a block protocol request to write data to a first object chunk of the immutable object, wherein the block protocol request indicates a first block mapped to the first object chunk in a first mapping of blocks to object chunks;
      in response to the block protocol request to write data to the first object chunk:
         creating a second immutable object including a second object chunk;
         generating a second mapping of blocks to object chunks that maps the first block to the second object chunk;
         translating the block protocol request to an object protocol request indicating the second object chunk of the second immutable object; and
         writing, to the second object chunk of the second immutable object, the data using the object protocol request.

5. The apparatus of claim 4, wherein the memory includes the programmed instructions that, when executed by the processor, further cause the apparatus to:
   receive a block protocol read request indicating the first block; and
   read, from the immutable object, the second object chunk of the second immutable object using an object protocol read request to read the second object chunk.

6. The apparatus of claim 5, wherein the memory includes the programmed instructions that, when executed by the processor, further cause the apparatus to:
   map the first block to the second object chunk of the second immutable object; and
   translate the block protocol read request to the object protocol read request.

7. A computer-implemented method, comprising:
   receiving, from a client, a block protocol request to read data of a volume, wherein a snapshot stored as an immutable object in an object store is exposed to a client as the volume;
   selecting a virtual machine (VM) to recover, wherein the VM is associated with the snapshot;
   in response to the block protocol request to read the data of the volume, launching the VM from the snapshot using an endpoint of the volume by selecting a host of the client in which to launch the VM and exposing the immutable object as the volume on a hypervisor of the selected host; and
   managing local access to object chunks of the immutable object, such that the client locally accesses the object chunks of the immutable object as blocks of the volume by:

receiving a block protocol request to write data to a first object chunk of the immutable object, wherein the block protocol request indicates a first block mapped to the first object chunk in a first mapping of blocks to object chunks;

in response to the block protocol request to write data to the first object chunk:

creating a second immutable object including a second object chunk;

generating a second mapping of blocks to object chunks that maps the first block to the second object chunk;

translating the block protocol request to an object protocol request indicating the second object chunk of the second immutable object; and writing, to the second object chunk of the second immutable object, the data using the object protocol request.

8. The method of claim 7, further comprising:

receive a block protocol read request indicating the first block; and reading, from the immutable object, the second object chunk of the second immutable object using an object protocol read request to read the second object chunk.

9. The method of claim 8, further comprising:

mapping the first block to the second object chunk of the second immutable object; and translating the block protocol read request to the object protocol read request.

* * * * *